United States Patent

[11] 3,573,387

[72] Inventors Carl R. Nebe
Norwalk;
James T. Switzer, Walnut, Calif.
[21] Appl. No. 822,150
[22] Filed May 6, 1969
[45] Patented Apr. 6, 1971
[73] Assignee American Telephone and Telegraph Company
New York, N.Y.

[54] SCREENING OF MISDIALED CALLS IN STEP-BY-STEP LOCAL LEVEL HUNTING CONNECTORS
7 Claims, 2 Drawing Figs.

[52] U.S. Cl. .......... 179/18, 179/27(FG)
[51] Int. Cl. .......... H04m 3/52, H04q 3/38
[50] Field of Search .......... 179/18.81, 27.24

*Primary Examiner*—Kathleen H. Claffy
*Assistant Examiner*—Thomas W. Brown
*Attorneys*—N. S. Ewing and James Warren Falk

ABSTRACT: A circuit is disclosed for screening misdialed calls in a local level hunting connector which may have line appearances both for normal subscribers as well as for a subscriber receiving an especially high volume of calls. The normal subscribers appearing on the connector are assigned directory numbers ending in 1 while the high volume subscriber is assigned a specific "tens" digit. The connector is prevented from responding directly to any tens digit until the first pulse of the units digit is received. The connector is then "unlocked" and permitted to hunt as it normally would. However, if a subsequent pulse is received, indicating a units digit other than 1, the normally grounded commutator segment corresponding to the tens digit becomes ungrounded and a commutator segment connected to an intercept position is grounded unless the tens digit is the specific one assigned to the high volume subscriber.

INVENTORS C. R. NEBE
J. T. SWITZER

BY Howard R Popper

ATTORNEY

SCREENING OF MISDIALED CALLS IN STEP-BY-STEP LOCAL LEVEL HUNTING CONNECTORS

BACKGROUND OF THE INVENTION

This invention relates to telephone switching systems and more particularly to equipment for screening misdialed calls in a local level hunting connector.

Where commercial telephone subscribers require a number of incoming lines, the confusion of publishing ten, 20, or even more directory numbers for that subscriber has been alleviated by using a local level hunting connector and publishing only a single directory number for the subscriber. The connector completes the incoming call over any idle one of the group of lines connecting to the subscriber, rather than only over a line corresponding to the dialed number. Here, rather than identifying a particular line, the dialed number identifies only the group of lines, with the selection of the line over which a call will be completed being made by the connector itself.

Normally a number of subscribers may be served by the lines available on a single connector and ordinarily when a customer misdials a number little inconvenience results. However, if an exceptionally high volume of calls is made to one of these subscribers, even the normally encountered incidence of digit dialing errors may very well result in a large number of calls, intended for that one subscriber, being routed to the other customers served by the connector. This would, of course, greatly degrade the quality of telephone service for those customers, occasionally even to the point of blocking other traffic thereto.

It is therefore an object of our invention to reduce the incidence of blocking in a local level hunting connector having a high volume subscriber.

Another object is to screen and intercept misdialed calls, thereby preventing calls intended for a high volume subscriber from being completed to other subscribers appearing on the same local level hunting connector.

SUMMARY OF THE INVENTION

These and other objects of our invention are achieved, in one illustrative embodiment, by assigning directory numbers ending in the units digit 1 to all subscribers on the local level hunting connector except the high volume subscriber, who is assigned a directory number ending in a digit other than 1. The connector is prevented from responding to the dialed tens digit until the initial pulse of the units digit is received. If the dialed tens digit is associated with a normal volume subscriber, and the units digit consists of only one pulse, the tens digit is allowed to mark its level in the connector and the call is allowed to complete. However, if a second pulse is received with the units digit (indicating a units digit other than 1), the normal marking of the level corresponding to the tens digit is interrupted and the intercept level of the connector is marked instead, thereby routing the misdialed call to an intercept position. If the dialed tens digit is associated with a high volume subscriber, it may properly end in a units digit other than 1, and the tens digit is allowed to mark its level in the connector as soon as the first pulse of the units digit, whatever its value, is received. In this manner calls to the connector are screened for particular combinations of tens and units digits so that misdialed calls intended for a high-volume subscriber will not result in an undue amount of erroneous traffic for other subscribers served by the same connector.

BRIEF DESCRIPTION OF THE DRAWING

The foregoing and other objects of the invention may be more readily comprehended from an examination of the following specification, the appended claims and the drawing in which:

GENERAL DESCRIPTION

Figure 1:
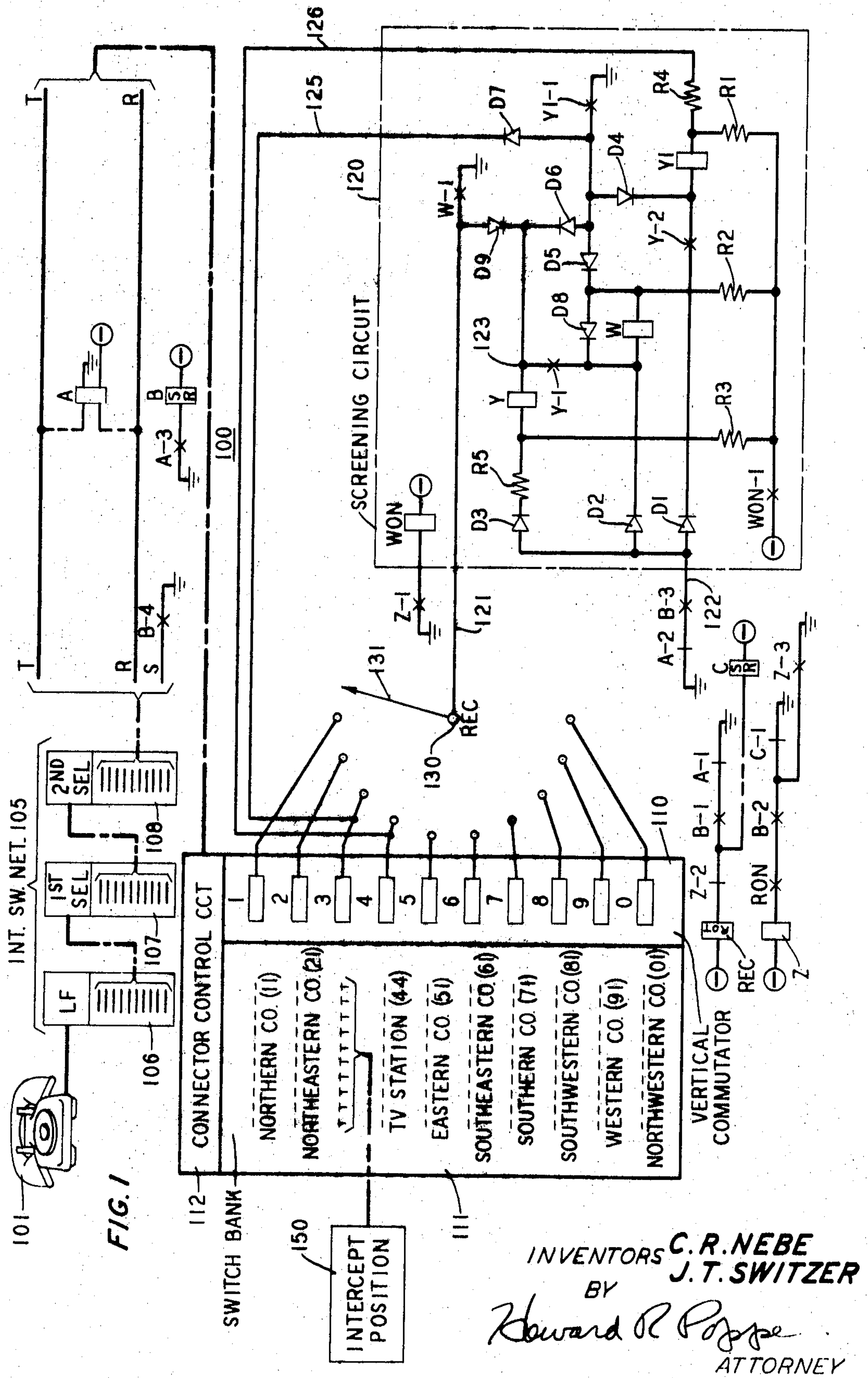
FIG. 1 shows a portion of a local level hunting connector and a screening arrangement embodying our invention.

Referring now to FIG. 1, there is shown a calling party 101 connected through an intermediate switching network 105 to a portion of a local level hunting connector 100 which has a high volume subscriber appearing at level 4. Connector 100 includes a connector control circuit 112, a vertical commutator 110 normally marked in response to the dialed tens digit of a call, and a switch bank 111. Switch bank 111 comprises a bank of 10 terminals at each level, with the levels corresponding to the segments of vertical commutator 110. The terminals on each level all connect to a single subscriber over individual lines; for example, the 10 lines of level 7 may connect to the Southern Co. though some may be unconnected if the Southern Co. is not entitled to 10 lines. When a call is received intended for the Southern Co., segment 7 of vertical commutator 110 is marked (as will be explained later in detail), connector 100 climbs to level 7 of switch bank 111 and the first idle line at that level is seized with the call to the Southern Co. being completed thereover.

In accordance with our invention, after the pulses of the tens digit have been received, screening circuit 120 is activated. When the first pulse of the units digit is received, circuit 120 grounds lead 121 through arm 131 of rotary switch REC, grounding the level of vertical commutator 110 corresponding to the dialed tens unit. If the units digit consists of more than one pulse and the tens digit was not 4 (indicating a call to the high volume subscriber), circuit 120 removes ground from lead 121 and applies ground to lead 125 instead. The grounding of lead 125 causes the hunting connector to move to the intercept level (level 3) to route the call to intercept position 150 rather than the level corresponding to the dialed number, thereby preventing the completion of the misdialed call to any normal subscriber on the connector.

Detailed Description

Figure 2:
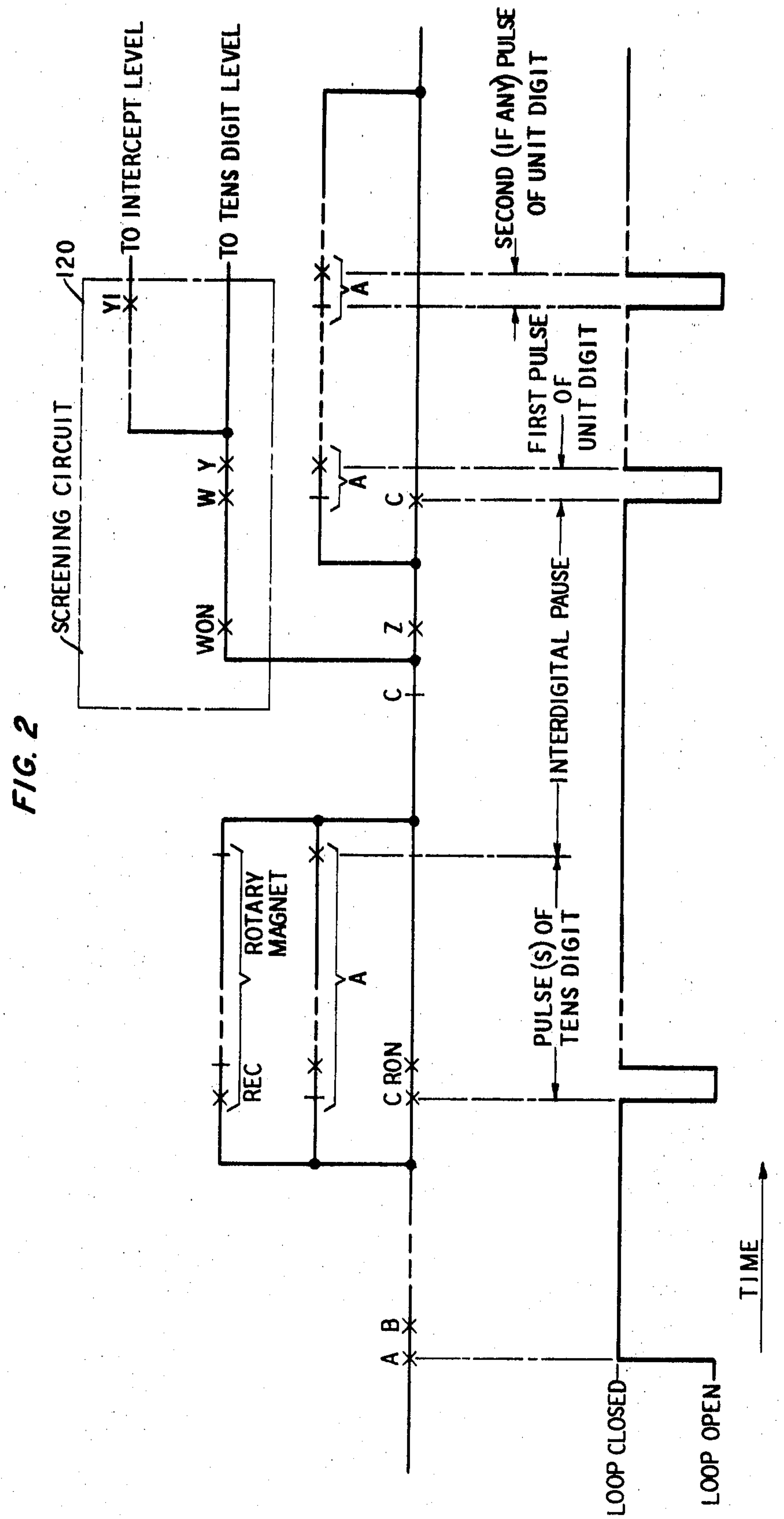
FIG. 2 shows a sequence chart depicting the relative sequence of operation of the various relays and electromagnets of the illustrative embodiment relative to incoming dial pulses.

When an incoming call is routed to one of the subscribers appearing on connector 100, the connector responds to the pulses of the tens and units digits from calling party 101 by the operation of the various relays and electromagnets shown in FIG. 1 and depicted from the point of view of operational sequence in FIG. 2. Referring now to FIG. 1, when the transmission loop is closed from calling telephone 101 through the intermediate switching network 105 consisting of a conventional arrangement of a line finder 106, a first selector 107, and a second selector 108, an operating path for relay A of connector 100 is completed in the conventional manner. Relay A operated completes the usual operating path through a make contact A–3 for relay B, which is slow releasing and remains operated throughout dialing. With relay B operated, ground is applied to the sleeve lead S through make contact B–4 to hold the preceding switches of the intermediate switching network 105 and prepare an operating path for connector relay C in the usual manner.

The initial pulse of the tens digit opens the transmission loop, interrupting the operating path for relay A which releases to follow dial pulsing in the usual manner. With relay A released, the operating path for relay C is completed through make contact B–1 and break contact A–1 to ground. Relay C is also slow releasing and will remain operated throughout the pulsing of the tens digit, releasing during the interdigital pause, as may be seen by reference to FIG. 2.

As each pulse of the tens digit opens the transmission loop and releases relay A, the movable arm 131 of the rotary switch REC will be advanced one terminal by the operation of the REC rotary magnet. The relationship between the pulses of the tens digit and the operation of the REC rotary magnet is shown in FIG. 2 for the interval designated "Pulse(s) of Tens Digit." The mechanism for advancing arm 131 in to the operation of the REC rotary magnet has not been shown, but is the usual means for recording and storing the total number of pulses comprising the tens digit.

The rotary-off-normal contact of rotary switch REC will be closed as soon as the switch advances from the normal position. The well-known mechanism controlling this contact closure has not been shown, but is represented symbolically by the RON make contact.

Following the last pulse of the tens digit, the continued operation of relay A interrupts the operating path for relay C at break contact A–1. During the interdigital pause when its slow release period expires, relay C will release. This completes a normal operating path for the Z relay through the now operated make contact RON (winding not shown), make contact B–2 and the released break contact C–1 to ground. With relay Z operated, break contact Z–2 prevents the REC rotary magnet from responding to the pulses of the subsequent units digit. In addition, a locking path is established to ground through make contact Z–3, so that the Z relay will remain operated when relay C reoperates in response to the first pulse of the units digit (as shown in FIG. 2).

The operation of the Z relay also initiates the operation of screening circuit 120 which is provided in accordance with our invention. Rather than having the ground potential for marking the desired segments of vertical commutator 110 connected directly to the rotary switch REC at terminal 130, as in the conventional manner, marking ground is instead applied through screening circuit 120 over lead 121. When relay Z operates, the operating path for the WON relay of screening circuit 120 is completed through make contact Z-1 to ground. The operation of relay WON energizes the screening circuit 120 by applying operating battery through make contact WON–1. The screening circuit is now responsive to the pulses of the units digit as applied over lead 122.

The first pulse of the units digit will cause the A relay in connector 100 to release. Relay B is slow releasing and remains operated so that ground is applied to lead 122 through break contact A–2 and make contact B–3. The grounding of lead 122 causes relay W to operate, its left side being grounded through diode D2 and its right side connecting to battery through resistor R2 and contact WON–1. With relay W operated, ground is applied through make contact W–1 to lead 121, common terminal 130 of rotary switch REC, and movable arm 131 to the segment of commutator 110 connected to the terminal of rotary switch REC at which arm 131 came to rest (corresponding to the dialed tens digit).

At the expiration of the first pulse of the units digit, relay A reoperates and ground is removed from lead 122 by the interruption at break contact A–2. Although ground has been present on the right side of relay Y through diode D9 and make contact W–1, relay Y has not yet operated with battery provided over resistor R3, because the resistance battery was shunted to ground on lead 122 through resistor R5 and diode D3. The interruption of this shunt path by break contact A–2 permits the left side of relay Y to reach battery through resistor R3 and make contact WON–1. Relay Y now operates and completes a locking path for relay W through its make contact Y–1. Ground is applied to both relay Y and relay W at point 123 through diode D9 and make contact W–1.

Under normal operation connector 100 would now climb to the grounded segment of commutator 110 and hunt for an idle line at that level in switch bank 111, as in the prior art arrangements. However, in accordance with the present invention, if a second pulse is received, indicating a units digit greater than 1, the normal operation is interrupted in accordance with the following.

When a units digit greater than 1 is received, the second pulse of the units digit again opens the transmission loop, and relay A releases. Once again ground is applied to lead 122. Relay Y1 now operates since its left side is connected to ground on lead 122 through make contact Y–2, diode D1, make contact B–3 and break contact A–2, while its right side is connected to battery through resistor R1 and contact WON–1. This sequence is also shown in FIG. 2. Once operated, relay Y1 locks through diode D4 and its own make contact Y1–1 to ground.

At this same time, relays Y and W are shunted down and release. Relay y has its battery supply shunted down by the reappearance of ground on lead 122 and relay W has its battery shunted down by the operation of contact Y1–1. The release of relay W interrupts the application of commutator marking ground to vertical commutator 110 by removing ground from lead 121 when make contact W–1 opens. Marking ground is applied instead to the intercept level (level 3) over lead 125 through diode D7 and make contact Y1–1 Connector 100 then rises to level 3, selects an idle line at that level in switch bank 111, and connects calling party 101 to intercept position 150. In this manner the misdialed call has been detected by recognizing a units digit other than 1 and the misdialed call has been routed to intercept without disturbing any of the telephone subscribers served by connector 100.

When a valid call is placed to the high volume subscriber assumed to be served by connector 100, the called tens digit will be 4 and the high volume subscriber, a TV STATION, may have a "non–1 units digit. The circuit operates as previously described except that relay Y1 is prevented from operating in response to a second pulse of the units digit. The advancement of rotary switch REC to the terminal connected to commutator level 4 forwards ground from arm 131 over lead 126 and resistor R4 to the right side of relay Y1. The shunting of battery at resistor R1 prevents relay Y1 from operating. (Relay W does not release until relay Y1 operates). With commutator segment 4 grounded, and relay Y1 prevented from operating, connector 100 will ignore the units digit, climb to level 4 and hunt the first idle line at that level in switch bank 111, as in a normal arrangement.

It is understood that this embodiment was described merely to illustrate the principles of our invention. Other arrangements may be devised by those skilled in the art which do not depart from the spirit and scope of this invention. For example, the high volume subscriber was described as appearing on level 4, this subscriber could appear on any level, or even several levels, as where a block of 20 or more lines are assigned to the subscriber and the connector is arranged to hunt the entire block of lines. By the same reasoning, the intercept level need not be level 3 as described, but may by any level or for that matter, more than one level. It should also be apparent that, properly isolated by diodes, more than one level could connect to lead 126, thereby permitting a plurality of high volume subscribers to appear on the connector, while still providing some measure of protection for the other subscribers from "wrong number" calls.

We claim:

1. In a telephone switching system having a local level hunting connector for responding to a predetermined digit of a called telephone number to establish a connection to one of a plurality of telephone lines, said connector having an intercept level for calls which are not to be completed to any of said lines, a circuit comprising:

means for storing said predetermined digit;

means for preventing the normal response of said connector to said stored digit;

means responsive to the first pulse of a subsequent digit of said called number for permitting said connector to respond to said stored digit; and intercept means responsive to a second pulse of said subsequent digit for preventing said connector from responding to said stored digit and for marking said intercept level thereof.

2. A circuit in accordance with claim 1 further including means responsive to the storage of a particular value of said predetermined digit for inhibiting said intercept means.

3. A local level hunting connector switch for use in a step-by-step switching system, said switch being normally arranged to record one of a sequence of dialed telephone number digits, to mark a segment of its vertical commutator corresponding to said one digit, to automatically step to the level signified by said marked commutator segment and to automatically select an idle line on said level, said switch including a dialed number screening circuit comprising:

means for interrupting the normal response of said switch after said one of said sequence of digits is recorded;

means responsive to the first pulse of a subsequently dialed digit for continuing said normal response of said switch; and control means responsive to a second pulse of said subsequently dialed digit for again interrupting said normal response of said switch.

4. A switch in accordance with claim 3 further including:

an intercept position connected to all the lines appearing on a predetermined level of said switch; and wherein said control means includes:

means responsive to said second pulse for marking said predetermined switch level and for automatically stepping said switch to said predetermined level, so that said calling party is connected to said intercept position.

5. A switch in accordance with claim 3 further including means responsive to the recording of a specific value of said one of said sequence of digits for inhibiting said control means.

6. A switch in accordance with claim 5 wherein said control means includes:

relay means energized by said first pulse and operable in response to said second pulse; and wherein said inhibiting means includes:

means for shunting said relay means to prevent its operation.

7. In a telephone switching system, the combination comprising:

a calling telephone;

an intercept position;

switch means having a plurality of levels selectable in accordance with the value of a first digit dialed by said calling telephone, said intercept position appearing at one of said levels of said switch means;

selector means responsive to said first digit for selecting the level of said switch means corresponding thereto;

screening means responsive to any of a plurality of predetermined second digits dialed by said calling telephone for controlling said selector means to select said one level; and override means responsive to a particular value of said first digit for preventing said screening means from controlling said selector means to select said one level and for permitting said selector means to select said level corresponding to said first digit dialed by said calling telephone.